(12) United States Patent
Li (10) Patent No.: US 12,511,143 B2
(45) Date of Patent: Dec. 30, 2025

(54) METHOD, APPARATUS, AND DEVICE FOR GENERATING BARE METAL SERVER LINUX SYSTEM IMAGE

(71) Applicant: INSPUR SUZHOU INTELLIGENT TECHNOLOGY CO., LTD., Jiangsu (CN)

(72) Inventor: Shasha Li, Jiangsu (CN)

(73) Assignee: INSPUR SUZHOU INTELLIGENT TECHNOLOGY CO., LTD., Jiangsu (CN)

( * ) Notice: Subject to any disclaimer, the term of this patent is extended or adjusted under 35 U.S.C. 154(b) by 797 days.

(21) Appl. No.: 17/784,866

(22) PCT Filed: Jul. 23, 2020

(86) PCT No.: PCT/CN2020/103647
§ 371 (c)(1),
(2) Date: Sep. 19, 2022

(87) PCT Pub. No.: WO2021/114672
PCT Pub. Date: Jun. 17, 2021

(65) Prior Publication Data
US 2023/0004411 A1    Jan. 5, 2023

(30) Foreign Application Priority Data

Dec. 13, 2019  (CN) .......................... 201911285977.1

(51) Int. Cl.
*G06F 9/455*    (2018.01)

(52) U.S. Cl.
CPC ...... *G06F 9/45541* (2013.01); *G06F 9/45554* (2013.01); *G06F 2009/45562* (2013.01); *G06F 2009/45583* (2013.01)

(58) Field of Classification Search
CPC ............. G06F 9/45541; G06F 9/45554; G06F 2009/45562; G06F 2009/45583; G06F 8/63; G06F 9/45558
See application file for complete search history.

(56) References Cited

U.S. PATENT DOCUMENTS

| 2011/0179260 | A1  | 7/2011 | Dong et al. |
| 2013/0205063 | A1* | 8/2013 | Zhang ................. G06F 11/1451 711/E12.008 |

(Continued)

FOREIGN PATENT DOCUMENTS

| CN | 102789369 A | 11/2012 |
| CN | 103885833 A | 6/2014 |

(Continued)

OTHER PUBLICATIONS

International Search Report of corresponding PCT application PCT/CN2020/103647, mailed Oct. 30, 2020, 7 pages.

(Continued)

*Primary Examiner* — Dong U Kim
(74) *Attorney, Agent, or Firm* — Cooper Legal Group, LLC (57) ABSTRACT

Provided are a method, apparatus, and device for generating a bare metal server Linux system image, and a memory medium. The method includes: analyzing a received bare metal server Linux system image generation request so as to obtain a target configuration parameter of a target bare metal server Linux system image to be generated and a target operating system model; selecting, from a redundant array of independent disks driver library, a target redundant array of independent disks driver that matches the target configuration parameter and the target operating system model; adding the target redundant array of independent disks driver to a boot file of a virtual machine to generate a target boot file; and exporting, from the virtual machine, a virtual (Continued)

machine disk image file containing the target boot file as the target bare metal server Linux system image.

17 Claims, 3 Drawing Sheets

(56) References Cited

U.S. PATENT DOCUMENTS

| | | | |
|---|---|---|---|
| 2018/0095679 A1* | 4/2018 | Wysocki | G06F 3/0689 |
| 2019/0250997 A1* | 8/2019 | Karasev | G06F 11/1438 |
| 2019/0334909 A1* | 10/2019 | Schmitt | G06F 3/0604 |
| 2022/0174096 A1* | 6/2022 | Schmitt | H04L 63/062 |

FOREIGN PATENT DOCUMENTS

| | | | |
|---|---|---|---|
| CN | 103984575 | A | 8/2014 |
| CN | 104375867 | A | 2/2015 |
| CN | 106713516 | A | 5/2017 |
| CN | 107438102 | A | 12/2017 |
| CN | 109960517 | A | 7/2019 |
| CN | 111090439 | A | 5/2020 |
| KR | 20060039050 | A | 5/2006 |

OTHER PUBLICATIONS

Written Opinion of International Searching Authority of corresponding PCT application PCT/CN2020/103647, mailed Oct. 30, 2020, 9 pages.
First Office Action of corresponding CN priority application CN201911285977.1, Mailed Mar. 3, 2021, 10 pages.

* cited by examiner

METHOD, APPARATUS, AND DEVICE FOR GENERATING BARE METAL SERVER LINUX SYSTEM IMAGE

This application claims priority to Chinese Patent Application No. 201911285977.1, filed on Dec. 13, 2019, in China National Intellectual Property Administration and entitled "Method, Apparatus, and Device for Generating Bare Metal Server Linux System Image", the contents of which are hereby incorporated by reference in its entirety.

FIELD

The present disclosure relates to the technical field of computer applications, and particularly to a method, apparatus, and device for generating a bare metal server Linux system image, and a computer-readable memory medium.

BACKGROUND

A bare metal server, as flexible as a virtual machine and capable of implementing high-performance computing, is an elastically extensible high-performance computing server with the same computing performance as a conventional physical machine as well as an upgrade of a conventional physical server. It has the high performance of the conventional physical server, a convenient management platform like a cloud host, and the characteristic of security isolation, achieves high computing performance for users, and may meet requirements of a core application scenario for high performance and stability. Therefore, there is a deployment scenario of deploying a Linux system in a bare metal server of a virtualization platform.

An existing method for deploying a Linux system in a bare metal server of a virtualization platform is generating a bare metal server Linux system image by use of a unified virtual machine boot file. However, different requirements may be stored for different users, so service requirements of users cannot be met, and the user experience is poor.

In summary, how to effectively solve the problem that the existing method for deploying a Linux system in a bare metal server cannot meet a service requirement of a user and is poor in user experience is a problem urgent to be solved by those skilled in the art currently.

SUMMARY

An objective of the present disclosure is to provide a method for generating a bare metal server Linux system image. By the method, service requirements of a user are met better, and the user experience is improved. Another objective of the present disclosure is to provide an apparatus and device for generating a bare metal server Linux system image, and a computer-readable memory medium.

In order to solve the foregoing technical problem, the present disclosure provides the following technical solution.

A method for generating a bare metal server Linux system image is provided, including:

analyzing a received bare metal server Linux system image generation request so as to obtain a target configuration parameter of a target bare metal server Linux system image to be generated and a target operating system model;

selecting, from a redundant array of independent disks driver library, a target redundant array of independent disks driver that matches the target configuration parameter and the target operating system model, wherein the redundant array of independent disks driver library pre-stores a correspondence between each configuration parameter, each operating system model, and each redundant array of independent disks driver;

adding the target redundant array of independent disks driver to a boot file of a virtual machine pre-mounted and installed with a Linux virtual machine operating system to generate a target boot file;

exporting, from the virtual machine, a virtual machine disk image file containing the target boot file, and determining the virtual machine disk image file as the target bare metal server Linux system image.

In a specific implementation mode of the present disclosure, after the exporting, from the virtual machine, a virtual machine disk image file containing the target boot file and before the determining the virtual machine disk image file as the target bare metal server Linux system image, the method further includes:

performing file name modification on the virtual machine disk image file according to a preset bare metal server Linux system image name format to obtain a modified virtual machine disk image file consistent with the preset bare metal server Linux system image name format.

The determining the virtual machine disk image file as the target bare metal server Linux system image includes:

determining the modified virtual machine disk image file as the target bare metal server Linux system image.

In a specific implementation mode of the present disclosure, the adding the target redundant array of independent disks driver to a boot file of a virtual machine pre-mounted and installed with a Linux virtual machine operating system to generate a target boot file includes:

performing a backup operation on the boot file of the virtual machine pre-mounted and installed with the Linux virtual machine operating system to obtain a backup boot file;

adding the target redundant array of independent disks driver to the backup boot file to generate the target boot file.

In a specific implementation mode of the present disclosure, the analyzing a received bare metal server Linux system image generation request so as to obtain a target configuration parameter of a target bare metal server Linux system image to be generated and a target operating system model includes:

analyzing the received bare metal server Linux system image generation request so as to obtain the target configuration parameter of the target bare metal server Linux system image to be generated, the target operating system model, and request sender identity information corresponding to the bare metal server Linux system image generation request.

Before the selecting, from a redundant array of independent disks driver library, a target redundant array of independent disks driver that matches the target configuration parameter and the target operating system model, the method further includes:

performing identity verification on the request sender identity information;

when identity verification succeeds, executing the step of selecting, from a redundant array of independent disks driver library, a target redundant array of independent disks driver that matches the target configuration parameter and the target operating system model.

An apparatus for generating a bare metal server Linux system image is provided, including:

a request analysis module, configured to analyze a received bare metal server Linux system image generation request so as to obtain a target configuration parameter of a target bare metal server Linux system image to be generated and a target operating system model;

a driver selection module, configured to select, from a redundant array of independent disks driver library, a target redundant array of independent disks driver that matches the target configuration parameter and the target operating system model, wherein the redundant array of independent disks driver library pre-stores a correspondence between each configuration parameter, each operating system model, and each redundant array of independent disks driver;

a boot file generation module, configured to add the target redundant array of independent disks driver to a boot file of a virtual machine pre-mounted and installed with a Linux virtual machine operating system to generate a target boot file;

a system image generation module, configured to export, from the virtual machine, a virtual machine disk image file containing the target boot file, and determine the virtual machine disk image file as the target bare metal server Linux system image.

In a specific implementation mode of the present disclosure, the apparatus further includes:

a file name modification module, configured to, after the virtual machine disk image file containing the target boot file is exported from the virtual machine and before the virtual machine disk image file is determined as the target bare metal server Linux system image, perform file name modification on the virtual machine disk image file according to a preset bare metal server Linux system image name format to obtain a modified virtual machine disk image file consistent with the preset bare metal server Linux system image name format.

The system image generation module is specifically a module configured to determine the modified virtual machine disk image file as the target bare metal server Linux system image.

In a specific implementation mode of the present disclosure, the boot file generation module includes:

a boot file backup submodule, configured to perform a backup operation on the boot file of the virtual machine pre-mounted and installed with the Linux virtual machine operating system to obtain a backup boot file; and a boot file generation submodule, configured to add the target redundant array of independent disks driver to the backup boot file to generate the target boot file.

In a specific implementation mode of the present disclosure, the request analysis module is specifically a module configured to analyze the received bare metal server Linux system image generation request so as to obtain the target configuration parameter of the target bare metal server Linux system image to be generated, the target operating system model, and request sender identity information corresponding to the bare metal server Linux system image generation request.

The apparatus further includes:

an identity verification module, configured to, before the target redundant array of independent disks driver that matches the target configuration parameter and the target operating system model is selected from the redundant array of independent disks driver library, perform identity verification on the request sender identity information.

The driver selection module is specifically a module configured to, when identity verification succeeds, select, from the redundant array of independent disks driver library, the target redundant array of independent disks driver that matches the target configuration parameter and the target operating system model.

A device for generating a bare metal server Linux system image is provided, including:

a memory, configured to store a computer program;

a processor, configured to execute the computer program to implement any steps of the method for generating a bare metal server Linux system image as described above.

A computer-readable memory medium is provided, having a computer program stored thereon which, when executed by a processor, implements any steps of the method for generating a bare metal server Linux system image as described above.

The present disclosure provides a method for generating a bare metal server Linux system image, including: analyzing a received bare metal server Linux system image generation request so as to obtain a target configuration parameter of a target bare metal server Linux system image to be generated and a target operating system model; selecting, from a redundant array of independent disks driver library, a target redundant array of independent disks driver that matches the target configuration parameter and the target operating system model, wherein the redundant array of independent disks driver library pre-stores a correspondence between each configuration parameter, each operating system model, and each redundant array of independent disks driver; adding the target redundant array of independent disks driver to a boot file of a virtual machine pre-mounted and installed with a Linux virtual machine operating system to generate a target boot file; and exporting, from the virtual machine, a virtual machine disk image file containing the target boot file, and determining the virtual machine disk image file as the target bare metal server Linux system image.

It can be seen from the above technical solution that a received bare metal server Linux system image generation request is analyzed to obtain a target configuration parameter of a target bare metal server Linux system image and a target operating system model, a redundant array of independent disks driver library that pre-stores a correspondence between each configuration parameter, each operating system model, and each redundant array of independent disks driver is preset, a matched target redundant array of independent disks is selected according to the target configuration parameter and the target operating system model, and a boot program of a virtual machine is modified by use of the target redundant array of independent disks driver, thereby obtaining a customized target bare metal server Linux system image. Service requirements of a user are met better, and the user experience is improved.

Correspondingly, embodiments of the present disclosure also provide an apparatus and device for generating a bare metal server Linux system image, and a computer-readable memory medium, which correspond to the method for generating a bare metal server Linux system image and have the foregoing technical effects. Elaborations are omitted herein.

BRIEF DESCRIPTION OF THE DRAWINGS

In order to describe the technical solutions in the embodiments of the present disclosure or the prior art more clearly, the drawings required to be used in descriptions about the embodiments or the prior art will be introduced briefly below. Apparently, the drawings in the description below are only some embodiments of the present disclosure. Those ordinarily skilled in the art may further obtain other drawings according to these drawings without creative work.

DETAILED DESCRIPTION

In order to make the solutions of the present disclosure understood better by those skilled in the art, the present disclosure will be further described below in detail in combination with the drawings and specific implementation modes. Clearly, the described embodiments are not all but only part of embodiments of the present disclosure. All other embodiments obtained by those ordinarily skilled in the art based on the embodiments in the present disclosure without creative work shall fall within the scope of protection of the present disclosure.

Embodiment 1

Figure 1:
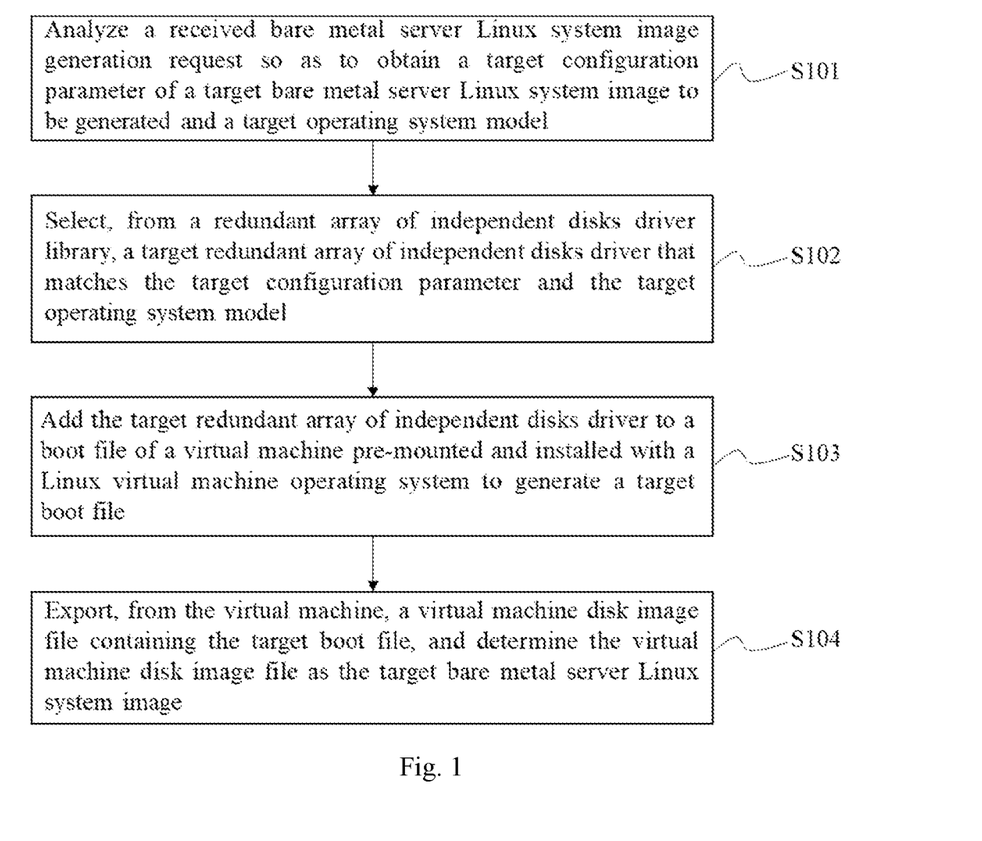
FIG. 1 is an implementation flowchart of a method for generating a bare metal server Linux system image according to an embodiment of the present disclosure.

Referring to FIG. 1, FIG. 1 is an implementation flowchart of a method for generating a bare metal server Linux system image according to an embodiment of the present disclosure. The method may include the following steps.

S101: analyze a received bare metal server Linux system image generation request so as to obtain a target configuration parameter of a target bare metal server Linux system image to be generated and a target operating system model.

When a bare metal server Linux system image needs to be generated, a bare metal server Linux system image generation request may be sent to a bare metal server Linux system image generation management center through a user terminal. The bare metal server Linux system image generation management center, when receiving the bare metal server Linux system image generation request, may contain a target configuration parameter of a target bare metal server Linux system image to be generated and a target operating system model in the bare metal server Linux system image generation request according to a service requirement of a current user. The received bare metal server Linux system image generation request may be analyzed so as to obtain the target configuration parameter of the target bare metal server Linux system image to be generated and the target operating system model.

S102: select, from a redundant array of independent disks driver library, a target redundant array of independent disks driver that matches the target configuration parameter and the target operating system model.

The redundant array of independent disks driver library pre-stores a correspondence between each configuration parameter, each operating system model, and each redundant array of independent disks driver.

A redundant array of independent disks driver library that pre-stores a correspondence between each configuration parameter, each operating system model, and each redundant array of independent disks driver may be preset. The correspondence may be that, for each configuration parameter, an operating system model corresponds to a set of redundant array of independent disks drivers. After the target configuration parameter of the target bare metal server Linux system image to be generated and the target operating system model are obtained by analysis, a target redundant array of independent disks driver that matches the target configuration parameter and the target operating system model may be selected from the redundant array of independent disks driver library.

S103: add the target redundant array of independent disks driver to a boot file of a virtual machine pre-mounted and installed with a Linux virtual machine operating system to generate a target boot file.

A blank virtual machine may be constructed in advance in a virtualization environment, a Linux operating system file is mounted to an optical disk driver of the constructed blank virtual machine, and a corresponding operating system is installed in the current blank virtual machine. After the target redundant array of independent disks driver that matches the target configuration parameter and the target operating system model is selected, the target redundant array of independent disks driver may be added to a boot file of the virtual machine pre-mounted and installed with the Linux virtual machine operating system, thereby modifying a hardware device drive parameter and adding a bare metal server memory card related driver to the boot file to generate a target boot file.

S104: export, from the virtual machine, a virtual machine disk image file containing the target boot file, and determine the virtual machine disk image file as the target bare metal server Linux system image.

After the target boot file is generated, a virtual machine disk image file containing the target boot file may be exported from the virtual machine. Specifically, disk image files, i.e., an Open Virtualization Format (OVF) file and a disk image format file (qcow2 file), may be exported through an OVF file exporting function of the virtual machine, wherein the OVF file is a virtual machine configuration file, and the disk image format file is a virtual machine disk image file. The virtual machine disk image file is determined as the target bare metal server Linux system image.

It can be seen from the above technical solution that a received bare metal server Linux system image generation request is analyzed to obtain a target configuration parameter of a target bare metal server Linux system image and a target operating system model, a redundant array of independent disks driver library that pre-stores a correspondence between each target configuration parameter, each target operating system model, and each redundant array of independent disks driver is preset, a matched target redundant array of independent disks is selected according to the target configuration parameter and the target operating system model, and a boot program of a virtual machine is modified by use of the target redundant array of independent disks driver, thereby obtaining a customized target bare metal server Linux system image. Service requirements of a user are met better, and the user experience is improved.

It is to be noted that, based on the above-mentioned embodiment, the embodiments of the present disclosure also provide a corresponding improved solution. Interferences may be made between the same steps or corresponding steps in the following embodiment and embodiment 1 and between corresponding beneficial effects. Elaborations are omitted in the following improved embodiment.

Embodiment 2

Figure 2:
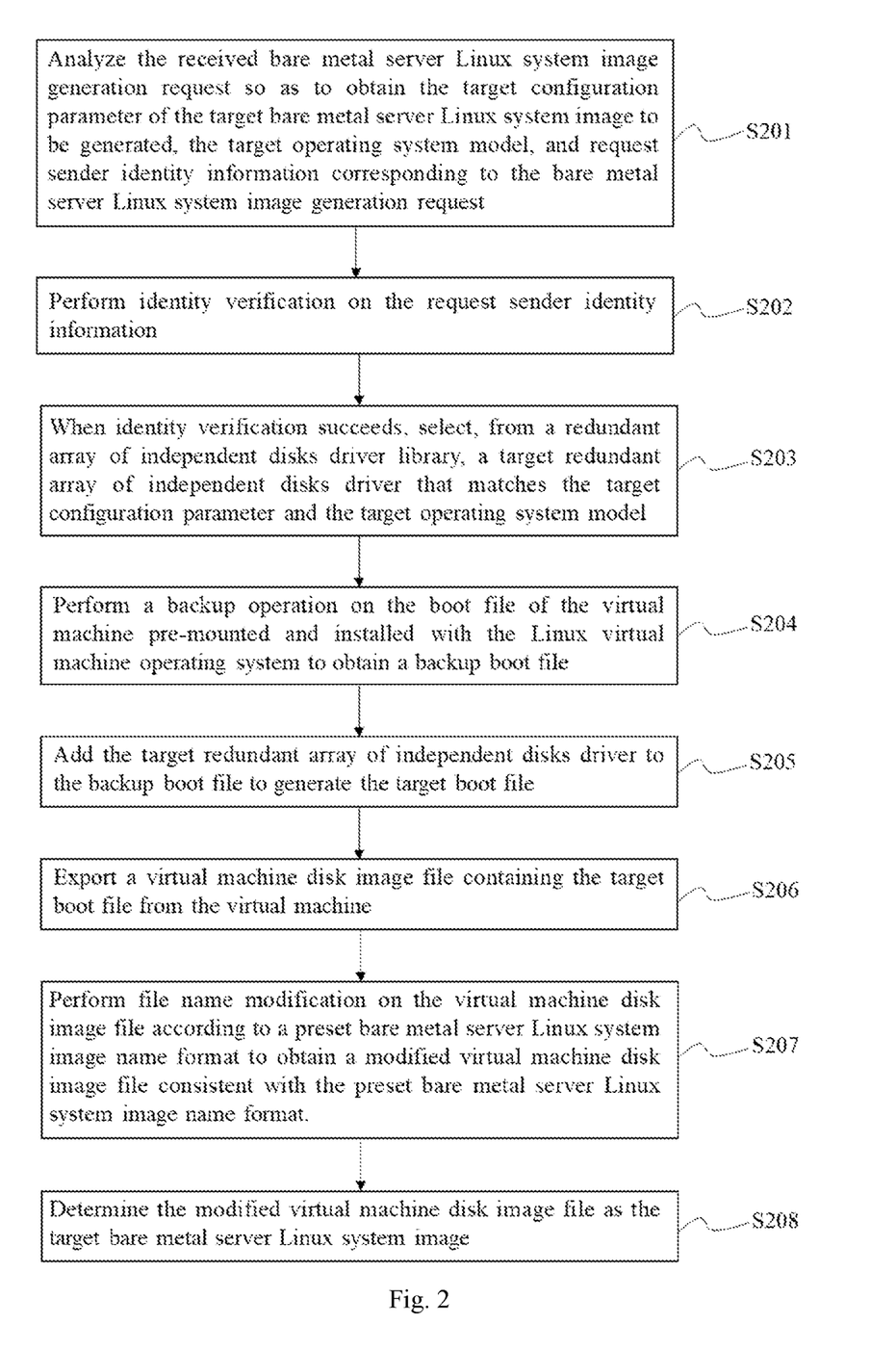
FIG. 2 is another implementation flowchart of a method for generating a bare metal server Linux system image according to an embodiment of the present disclosure.

Referring to FIG. 2, FIG. 2 is another implementation flowchart of a method for generating a bare metal server Linux system image according to an embodiment of the present disclosure. The method may include the following steps.

S201: analyze the received bare metal server Linux system image generation request so as to obtain the target configuration parameter of the target bare metal server Linux system image to be generated, the target operating system model, and request sender identity information corresponding to the bare metal server Linux system image generation request.

The bare metal server Linux system image generation request may further contain request sender identity information corresponding to the bare metal server Linux system image generation request. After the bare metal server Linux system image generation request is received, the bare metal server Linux system image generation request may be analyzed to obtain the request sender identity information corresponding to the bare metal server Linux system image generation request.

S202: perform identity verification on the request sender identity information.

After the bare metal server Linux system image generation request is analyzed to obtain the request sender identity information, identity verification may be performed on the request sender identity information. For example, identity verification may be performed on the request sender identity information based on a user name and a password, or based on a digital signature. A specific identity verification mode may be selected according to an actual situation. No limits are made thereto in the embodiment of the present disclosure. Performing identity verification on the request sender identity information improves the system security.

S203: when identity verification succeeds, select, from a redundant array of independent disks driver library, a target redundant array of independent disks driver that matches the target configuration parameter and the target operating system model.

The redundant array of independent disks driver library pre-stores a correspondence between each target configuration parameter, each target operating system model, and each redundant array of independent disks driver.

After identity verification is performed on the request sender identity information to obtain an identity verification result, only when identity verification succeeds, a target redundant array of independent disks driver that matches the target configuration parameter and the target operating system model is selected from a redundant array of independent disks driver library.

S204: perform a backup operation on the boot file of the virtual machine pre-mounted and installed with the Linux virtual machine operating system to obtain a backup boot file.

After a blank virtual machine is constructed, a Linux operating system file is mounted to an optical disk driver of the constructed blank virtual machine, and a corresponding operating system is installed in the current blank virtual machine, a backup operation may be performed on a boot file containing a hardware device drive parameter and a bare metal server memory card related driver in the virtual machine.

S205: add the target redundant array of independent disks driver to the backup boot file to generate the target boot file.

After the target redundant array of independent disks driver that matches the target configuration parameter and the target operating system model is selected, the target redundant array of independent disks driver may be added to the backup boot file to generate a target boot file. Performing the backup operation on the boot file ensures the security of the boot file and deals with exceptions better.

S206: export a virtual machine disk image file containing the target boot file from the virtual machine.

S207: perform file name modification on the virtual machine disk image file according to a preset bare metal server Linux system image name format to obtain a modified virtual machine disk image file consistent with the preset bare metal server Linux system image name format.

A standard bare metal server Linux system image name format may be preset. After the virtual machine disk image file is exported, file name modification may be performed on the virtual machine disk image file according to the preset bare metal server Linux system image name format, thereby obtaining a modified virtual machine disk image file consistent with the preset bare metal server Linux system image name format.

S208: determine the modified virtual machine disk image file as the target bare metal server Linux system image.

After file name modification is performed according to the preset bare metal server Linux system image name format to obtain the modified virtual machine disk image file, the modified virtual machine disk image file may be determined as the target bare metal server Linux system image. Therefore, the target bare metal server Linux system image may be recognized more conveniently.

Corresponding to the above method embodiment, the embodiments of the present disclosure also provide an apparatus for generating a bare metal server Linux system image. The following apparatus for generating a bare metal server Linux system image and the above method for generating a bare metal server Linux system image may correspondingly refer to each other.

Figure 3:
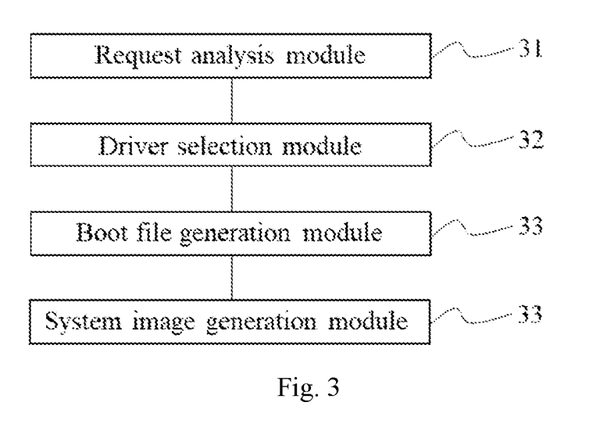
FIG. 3 is a structural block diagram of an apparatus for generating a bare metal server Linux system image according to an embodiment of the present disclosure.

Referring to FIG. 3, FIG. 3 is a structural block diagram of an apparatus for generating a bare metal server Linux system image according to an embodiment of the present disclosure. The apparatus may include:

a request analysis module 31, configured to analyze a received bare metal server Linux system image generation request so as to obtain a target configuration parameter of a target bare metal server Linux system image to be generated and a target operating system model;

a driver selection module 32, configured to select, from a redundant array of independent disks driver library, a target redundant array of independent disks driver that matches the target configuration parameter and the target operating system model, wherein the redundant array of independent disks driver library pre-stores a correspondence between each configuration parameter, each operating system model, and each redundant array of independent disks driver;

a boot file generation module 33, configured to add the target redundant array of independent disks driver to a boot file of a virtual machine pre-mounted and installed with a Linux virtual machine operating system to generate a target boot file;

a system image generation module 34, configured to export, from the virtual machine, a virtual machine disk image file containing the target boot file, and determine the virtual machine disk image file as the target bare metal server Linux system image.

It can be seen from the above technical solution that a received bare metal server Linux system image generation request is analyzed to obtain a target configuration parameter of a target bare metal server Linux system image and a target operating system model, a redundant array of independent disks driver library that pre-stores a correspondence between each target configuration parameter, each target operating system model, and each redundant array of independent disks driver is preset, a matched target redundant array of independent disks is selected according to the target configuration parameter and the target operating system model, and a boot program of a virtual machine is modified by use of the target redundant array of independent disks driver, thereby obtaining a customized target bare metal server Linux system image. Service requirements of a user are met better, and the user experience is improved.

In a specific implementation mode of the present disclosure, the apparatus may further include:

a file name modification module, configured to, after the virtual machine disk image file containing the target boot file is exported from the virtual machine and before the virtual machine disk image file is determined as the target bare metal server Linux system image, perform file name modification on the virtual machine disk image file according to a preset bare metal server Linux system image name format to obtain a modified virtual machine disk image file consistent with the preset bare metal server Linux system image name format.

The system image generation module 34 is specifically a module configured to determine the modified virtual machine disk image file as the target bare metal server Linux system image.

In a specific implementation mode of the present disclosure, the boot file generation module 33 includes:

a boot file backup submodule, configured to perform a backup operation on the boot file of the virtual machine pre-mounted and installed with the Linux virtual machine operating system to obtain a backup boot file; and a boot file generation submodule, configured to add the target redundant array of independent disks driver to the backup boot file to generate the target boot file.

In a specific implementation mode of the present disclosure, the request analysis module 31 is specifically a module configured to analyze the received bare metal server Linux system image generation request so as to obtain the target configuration parameter of the target bare metal server Linux system image to be generated, the target operating system model, and request sender identity information corresponding to the bare metal server Linux system image generation request.

The apparatus may further include:

an identity verification module, configured to, before the target redundant array of independent disks driver that matches the target configuration parameter and the target operating system model is selected from the redundant array of independent disks driver library, perform identity verification on the request sender identity information.

The driver selection module 32 is specifically a module configured to, when identity verification succeeds, select, from the redundant array of independent disks driver library, the target redundant array of independent disks driver that matches the target configuration parameter and the target operating system model.

Figure 4:
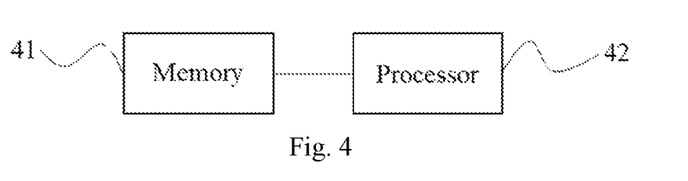
FIG. 4 is a structural block diagram of a device for generating a bare metal server Linux system image according to an embodiment of the present disclosure.

Corresponding to the above method embodiment, referring to FIG. 4, FIG. 4 is a schematic diagram of a device for generating a bare metal server Linux system image according to the present disclosure. The device may include:

a memory 41, configured to store a computer program;

a processor 42, configured to execute the computer program stored in the memory 41 to implement the following steps:

analyzing a received bare metal server Linux system image generation request so as to obtain a target configuration parameter of a target bare metal server Linux system image to be generated and a target operating system model; selecting, from a redundant array of independent disks driver library, a target redundant array of independent disks driver that matches the target configuration parameter and the target operating system model, wherein the redundant array of independent disks driver library pre-stores a correspondence between each target configuration parameter, each target operating system model, and each redundant array of independent disks driver; adding the target redundant array of independent disks driver to a boot file of a virtual machine pre-mounted and installed with a Linux virtual machine operating system to generate a target boot file; and exporting, from the virtual machine, a virtual machine disk image file containing the target boot file, and determining the virtual machine disk image file as the target bare metal server Linux system image.

Introductions about the device provided in the present disclosure refer to the method embodiment, and elaborations are omitted in the present disclosure.

Corresponding to the above method embodiment, the present disclosure also provides a computer-readable memory medium, storing a computer program that may be executed by a processor to implement the following steps:

analyzing a received bare metal server Linux system image generation request so as to obtain a target configuration parameter of a target bare metal server Linux system image to be generated and a target operating system model; selecting, from a redundant array of independent disks driver library, a target redundant array of independent disks driver that matches the target configuration parameter and the target operating system model, wherein the redundant array of independent disks driver library pre-stores a correspondence between each target configuration parameter, each target operating system model, and each redundant array of independent disks driver; adding the target redundant array of independent disks driver to a boot file of a virtual machine pre-mounted and installed with a Linux virtual machine operating system to generate a target boot file; and exporting, from the virtual machine, a virtual machine disk image file containing the target boot file, and determining the virtual machine disk image file as the target bare metal server Linux system image.

The computer-readable memory medium may include various media capable of storing program codes, such as a U disk, a mobile hard disk, a Read-Only Memory (ROM), a Random Access Memory (RAM), a magnetic disk, or an optical disk.

Introductions about the computer-readable memory medium provided in the present disclosure refer to the method embodiment, and elaborations are omitted in the present disclosure.

Each embodiment in the specification is described progressively. Descriptions made in each embodiment focus on differences from the other embodiments, and the same or similar parts in each embodiment refer to the other embodiments. The apparatus, device, and computer-readable memory medium disclosed in the embodiments correspond to the method disclosed in the embodiments, and thus are described relatively briefly, and related parts refer to the descriptions about the method.

The principle and implementation modes of the present disclosure are described herein with specific examples, and the descriptions about the above embodiments are only for helping in understanding the technical solution and core idea of the present disclosure. It is to be pointed out that those ordinarily skilled in the art may further make a plurality of improvements and embellishments to the present disclosure without departing from the principle of the present disclosure, and these improvements and embellishments shall also fall within the scope of protection of the claims of the present disclosure.

What is claimed is:

1. A method for generating an operating system image of a bare metal server, comprising:
    analyzing a received operating system image generation request so as to obtain a target configuration parameter and a target operating system model of a target operating system image;
    selecting, from a redundant array of independent disks driver library, a target redundant array of independent disks driver that matches the target configuration parameter and the target operating system model, wherein the redundant array of independent disks driver library pre-stores a correspondence between configuration parameters, operating system models, and redundant array of independent disks drivers;
    performing a backup operation on a boot file of a virtual machine pre-mounted and installed with a virtual machine operating system to obtain a backup boot file;
    adding the target redundant array of independent disks driver to the backup boot file to generate the target boot file, wherein the target boot file comprises a hardware device drive parameter and a bare metal server memory card driver; and
    exporting, from the virtual machine, a virtual machine disk image file containing the target boot file, and determining the virtual machine disk image file as the target operating system image.

2. The method according to claim 1, wherein after the exporting, from the virtual machine, a virtual machine disk image file containing the target boot file and before the determining the virtual machine disk image file as the target operating system image, the method further comprises:
    performing file name modification on the virtual machine disk image file according to a preset operating system image name format for the bare metal server to obtain a modified virtual machine disk image file consistent with the preset operating system image name format for the bare metal server.

3. The method according to claim 2, wherein the determining the virtual machine disk image file as the target operating system image comprises:
    determining the modified virtual machine disk image file as the target operating system image.

4. The method according to claim 1, wherein the analyzing a received operating system image generation request so as to obtain a target configuration parameter and a target operating system model of a target operating system image comprises:
    analyzing the received operating system image generation request so as to obtain the target configuration parameter and the target operating system model of the target operating system image, and request sender identity information corresponding to the operating system image generation request.

5. The method according to claim 4, wherein before the selecting, from a redundant array of independent disks driver library, a target redundant array of independent disks driver that matches the target configuration parameter and the target operating system model, the method further comprises:
    performing identity verification on the request sender identity information; and
    in response to identity verification succeeding, executing the selecting, from a redundant array of independent disks driver library, a target redundant array of independent disks driver that matches the target configuration parameter and the target operating system model.

6. The method according to claim 5, wherein the identity verification is performed based on a user name and a password, or based on a digital signature.

7. A device for generating operating system image of a bare metal server, comprising:
    a memory, configured to store a computer program;
    a processor, configured to execute the computer program to implement steps of a method for generating the operating system image of the bare metal server, wherein the method for generating the operating system image of the bare metal server comprises:
        analyzing a received operating system image generation request so as to obtain a target configuration parameter and a target operating system model of a target operating system image;
        selecting, from a redundant array of independent disks driver library, a target redundant array of independent disks driver that matches the target configuration parameter and the target operating system model, wherein the redundant array of independent disks driver library pre-stores a correspondence between configuration parameters, operating system models, and redundant array of independent disks drivers;
        performing a backup operation on a boot file of a virtual machine pre-mounted and installed with a virtual machine operating system to obtain a backup boot file;
        adding the target redundant array of independent disks driver to the backup boot file to generate the target boot file, wherein the target boot file comprises a hardware device drive parameter and a bare metal server memory card driver; and
        exporting, from the virtual machine, a virtual machine disk image file containing the target boot file, and determining the virtual machine disk image file as the target operating system image.

8. The device according to claim 7, wherein after the exporting, from the virtual machine, a virtual machine disk image file containing the target boot file and before the determining the virtual machine disk image file as the target operating system image, the method further comprises:

performing file name modification on the virtual machine disk image file according to a preset operating system image name format for the bare metal server to obtain a modified virtual machine disk image file consistent with the preset operating system image name format for the bare metal server.

9. The device according to claim 8, wherein the determining the virtual machine disk image file as the target operating system image comprises:

determining the modified virtual machine disk image file as the target operating system image.

10. The device according to claim 7, wherein the analyzing a received operating system image generation request so as to obtain a target configuration parameter and a target operating system model of a target operating system image comprises:

analyzing the received operating system image generation request so as to obtain the target configuration parameter and the target operating system model of the target operating system image, and request sender identity information corresponding to the operating system image generation request.

11. The device according to claim 10, wherein before the selecting, from a redundant array of independent disks driver library, a target redundant array of independent disks driver that matches the target configuration parameter and the target operating system model, the method further comprises:

performing identity verification on the request sender identity information; and in response to identity verification succeeding, executing the selecting, from a redundant array of independent disks driver library, a target redundant array of independent disks driver that matches the target configuration parameter and the target operating system model.

12. The device according to claim 11, wherein the identity verification is performed based on a user name and a password, or based on a digital signature.

13. A non-transitory computer-readable memory medium, having a computer program stored thereon which, when executed by a processor, implements steps of a method for generating an operating system image of a bare metal server, wherein the method comprises:

analyzing a received operating system image generation request so as to obtain a target configuration parameter and a target operating system model of a target operating system image;

selecting, from a redundant array of independent disks driver library, a target redundant array of independent disks driver that matches the target configuration parameter and the target operating system model, wherein the redundant array of independent disks driver library pre-stores a correspondence between configuration parameters, operating system models, and redundant array of independent disks drivers;

performing a backup operation on a boot file of a virtual machine pre-mounted and installed with a virtual machine operating system to obtain a backup boot file;

adding the target redundant array of independent disks driver to the backup boot file to generate the target boot file, wherein the target boot file comprises a hardware device drive parameter and a bare metal server memory card driver; and exporting, from the virtual machine, a virtual machine disk image file containing the target boot file, and determining the virtual machine disk image file as the target operating system image.

14. The non-transitory computer-readable memory medium according to claim 13, wherein after the exporting, from the virtual machine, a virtual machine disk image file containing the target boot file and before the determining the virtual machine disk image file as the target operating system image, the method further comprises:

performing file name modification on the virtual machine disk image file according to a preset operating system image name format for the bare metal server to obtain a modified virtual machine disk image file consistent with the preset operating system image name format for the bare metal server.

15. The non-transitory computer-readable memory medium according to claim 14, wherein the determining the virtual machine disk image file as the target operating system image comprises:

determining the modified virtual machine disk image file as the target operating system image.

16. The non-transitory computer-readable memory medium according to claim 13, wherein the analyzing a received operating system image generation request so as to obtain a target configuration parameter and a target operating system model of a target operating system image comprises:

analyzing the received operating system image generation request so as to obtain the target configuration parameter and the target operating system model of the target operating system image, and request sender identity information corresponding to operating system image generation request.

17. The non-transitory computer-readable memory medium according to claim 16, wherein before the selecting, from a redundant array of independent disks driver library, a target redundant array of independent disks driver that matches the target configuration parameter and the target operating system model, the method further comprises:

performing identity verification on the request sender identity information; and in response to identity verification succeeding, executing the selecting, from a redundant array of independent disks driver library, a target redundant array of independent disks driver that matches the target configuration parameter and the target operating system model.

* * * * *